United States Patent
Ladin et al.

(10) Patent No.: US 7,810,064 B2
(45) Date of Patent: Oct. 5, 2010

(54) SYSTEMS, METHODS AND COMPUTER PRODUCTS FOR TRAVERSING SCHEMATIC HIERARCHY USING A SCROLLING MECHANISM

(75) Inventors: Karl L. Ladin, Rochester, MN (US); James D. Strom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 11/848,821

(22) Filed: Aug. 31, 2007

(65) Prior Publication Data
US 2009/0064076 A1    Mar. 5, 2009

(51) Int. Cl.
G06F 9/455 (2006.01)
G06F 17/50 (2006.01)
(52) U.S. Cl. ........................................ 716/11
(58) Field of Classification Search .................... 716/11
See application file for complete search history.

(56) References Cited

U.S. PATENT DOCUMENTS

| | | | | |
|---|---|---|---|---|
| 4,970,664 | A * | 11/1990 | Kaiser et al. | 715/804 |
| 5,798,752 | A * | 8/1998 | Buxton et al. | 715/863 |
| 6,684,376 | B1 * | 1/2004 | Kerzman et al. | 716/8 |
| 2007/0192695 | A1 * | 8/2007 | Grotjohn et al. | 715/713 |
| 2007/0203678 | A1 * | 8/2007 | Horiike | 703/1 |
| 2008/0320418 | A1 * | 12/2008 | Huang et al. | 715/840 |
| 2009/0024975 | A1 * | 1/2009 | Ladin et al. | 716/11 |
| 2009/0064075 | A1 * | 3/2009 | Gross et al. | 716/11 |

OTHER PUBLICATIONS

Cera et al.; "Hierachical Role-based Viewing for Multi-level Information Security in Collaborative CAD"; Drexel University Department of COmputer Science; Jan. 2004; pp. 1-20.*
Lyons et al.; "KeyMenu: A Keyboard Based Hierarchical Menu"; Georgia Institute of Technology College of COmputing; Oct. 21, 2005; pp. 1-4.*
Hu et al.; "A Practical and Efficient Integrated System for VLSI/ULSI Physical Design"; Tsinghua University; 2004; pp. 1-5.*
Kim et al.; "Multi-Level modeling and access control for data sharing in collaborative design"; School of Information and Communications Engineering Sung Kyun Kwan University; May 4, 2005; pp. 1-11.*

* cited by examiner

Primary Examiner—Jack Chiang
Assistant Examiner—Suresh Memula
(74) Attorney, Agent, or Firm—Cantor Colburn LLP

(57) ABSTRACT

A method and a system for displaying hierarchical navigating, debugging and editing of selected hierarchical levels of design of a plurality of hierarchical levels of design in graphical hierarchical design applications, by assigning, from a schematic of the integrated circuit, a viewable scope of a block element desired for traversing. Opening the viewable scope of the block element, by using a mouse scrolling device to cause a cursor to highlight and roll in a downward direction over the highlighted block element, while holding down a predefined keyboard key. Then closing the viewable scope of the block element, by causing the cursor to be positioned in an empty area of the schematic, while holding down an other predefined keyboard key and rolling the mouse scrolling device in an upward direction.

4 Claims, 3 Drawing Sheets

SYSTEMS, METHODS AND COMPUTER PRODUCTS FOR TRAVERSING SCHEMATIC HIERARCHY USING A SCROLLING MECHANISM

TRADEMARKS

IBM® is a registered trademark of the International Business Machines Corporation, Armonk, N.Y., U.S.A. Other names used herein may be trademarks and registered trademarks, or trade or product names of International Business Machines Corporation or other companies.

TECHNICAL FIELD

The present invention relates generally to design, development and manufacturing of integrated circuits (ICs) on semiconductor chips, for use in automated computing systems. More particularly, the present invention relates to an integrated circuit (IC) schematic layout debugging and editing scrolling method and tool.

BACKGROUND

When conducting hierarchical design and physical development of ICs, circuit designers often face the problem of having voluminous smaller designs at various levels of the IC topological design hierarchy. When a layout designer needs to trace signal paths, which traverse numerous design hierarchies within the same design window for various levels of the IC topological design hierarchy, the designer/user usually has to select a menu item and verify that they wish to descend, i.e., scroll through, one level in the hierarchy. Furthermore, while attempting to debug the IC and/or edit circuit schematics that traverse numerous design hierarchies within the same design window, all the viewable hierarchical design levels distract and may confuse the circuit designer conducting the editing process involving only a few targeted hierarchical levels. Such electronic design automation tools fail to offer an easy interface to allow the user to traverse, debug and edit schematics involving multiple levels of design hierarchies.

Therefore, the need exists for a hierarchical design navigation method and a navigation apparatus for use in debugging layout induced electrical characteristics and layout-to-schematic verification (LVS) violations, as well as editing and other schematic modifications that are typical for those of ordinary skill in the art.

An additional need exists for a convenient design hierarchy method and device, which can save time and effort in viewing, editing and modifying design elements.

Furthermore, the need exists for a scroll mechanism to traverse through schematic hierarchical levels of design, giving circuit designers/users control over traversing a definable viewable scope at different levels of design hierarchy up and down quickly and smoothly, which in turn will aid the debugging and editing processes.

SUMMARY OF THE INVENTION

A schematic hierarchy traversing scrolling and displaying method and apparatus are disclosed for displaying on a computer display device, a viewable scope of an at least one hierarchical level of design from a plurality of hierarchical levels of design of a plurality of graphical hierarchical design applications, including card design, auto/plane design, computer aided design (CAD) and integrated circuit design. However, the exemplary embodiment is not limited to any one design application or discipline. A user using an input device of a computer, causes the computer to open a main debugging and editing screen. Using the input device, the user causes the computer to assign a viewable scope of a block element desired for traversing in a first hierarchical level of design of a plurality of hierarchical levels of design in an integrated circuit under test, by holding down a predefined keyboard key, selecting the block element desired for traversing by causing a cursor to be positioned over the block element desired for traversing and highlighting the block element desired for traversing. Using the input device, the user causes the computer to open the viewable scope of the block element desired for traversing, by rolling the input device down. Using the input device, the user causes the computer to descend and/or scroll through at least one hierarchical level of design of the integrated circuit by scrolling through the block element desired for traversing in the main debugging and editing screen. Still using the input device, the user causes the computer to close the viewable scope of the block element and reverse traverse to the first hierarchical level of design, by causing the computer to position the cursor in an empty area of the schematic, while holding down an other predefined keyboard key and rolling the input device up. The schematic hierarchy traversing scrolling and displaying method can be repeated for the plurality of hierarchical levels of design of the integrated circuit or the schematic hierarchy traversing scrolling and displaying method can be ended by the user, when the user determines that the desired levels of hierarchical design have been traversed. Thus, the user controls the input device causing the computer to perform a useful, concrete and tangible result of traversing the viewable scope of the at least one hierarchical level of design and conducting a debugging and/or an editing operation of the integrated circuit under test, without distractions from voluminous levels of IC topological information, of the plurality of hierarchical levels of design.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

Exemplary embodiments of a method and an apparatus are disclosed for automatically traversing schematic hierarchy, scrolling and displaying of hierarchical navigation in a viewable scope of an at least one hierarchical level of design from a plurality of hierarchical levels of design of a plurality of graphical hierarchical design applications, including card design, auto/plane design, computer aided design (CAD) and integrated circuit design. However, the exemplary embodiment is not limited to any one design application or discipline, even though an integrated circuit under test application is disclosed. The method and apparatus incorporate up and down scrolling activation operations to implement the automatic traversing schematic hierarchy scrolling and displaying of hierarchical navigation in integrated circuits under test. The disclosed exemplary embodiments are intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote limitations of quantity, but rather denote the presence of one or more of the referenced item(s).

Figure 1:
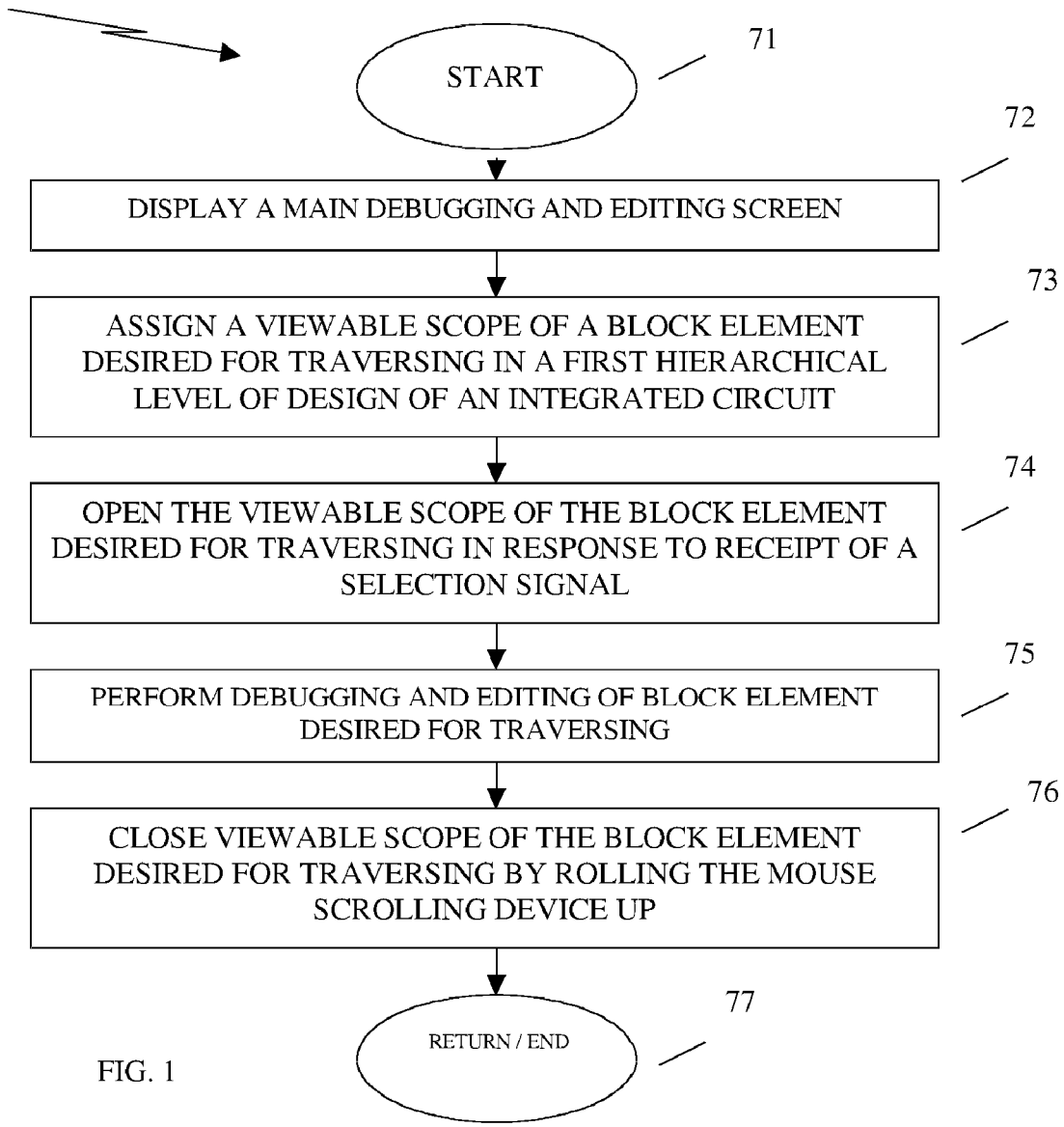
FIG. 1 illustrates operations in a method for automatically traversing schematic hierarchy, scrolling and displaying of hierarchical navigation in an integrated circuit under test.
Figure 2:
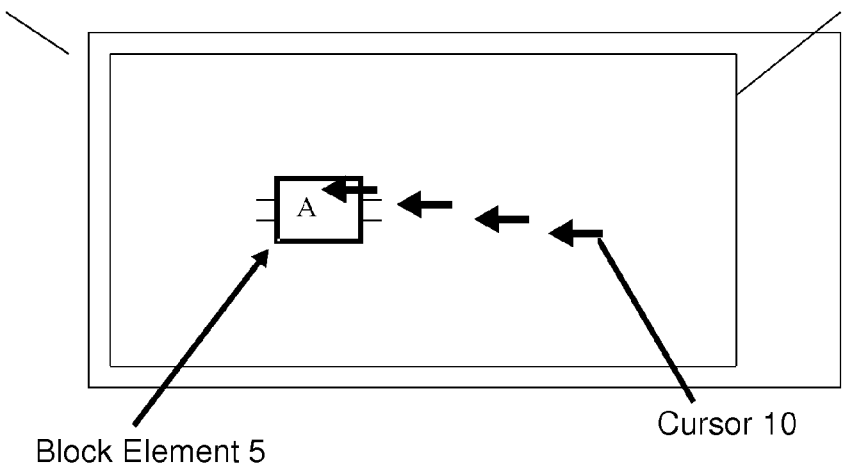
FIG. 2 illustrates two schematics S1 and S2 in a viewable scope of a hierarchical level of design in a main debugging and editing screen.
Figure 2:
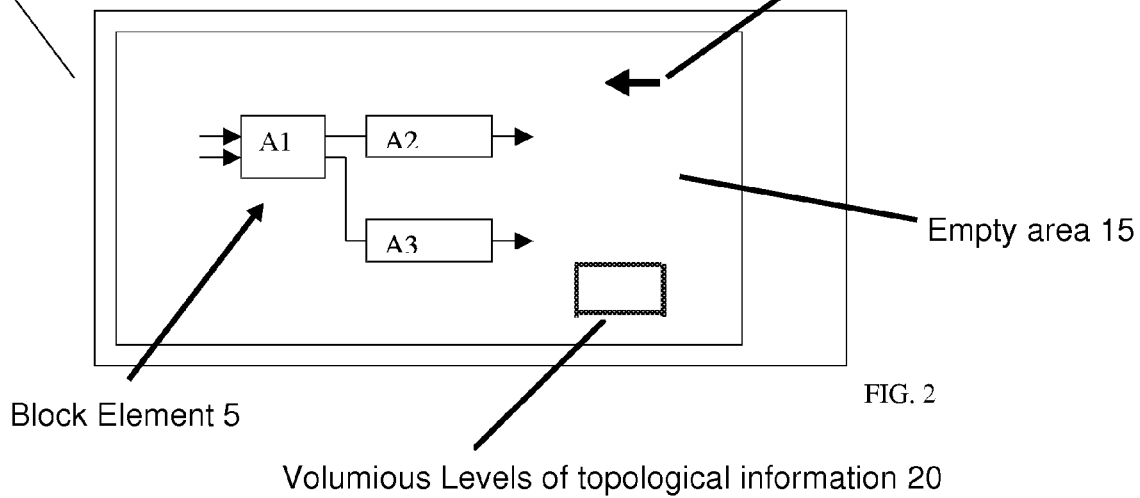
Figure 3:
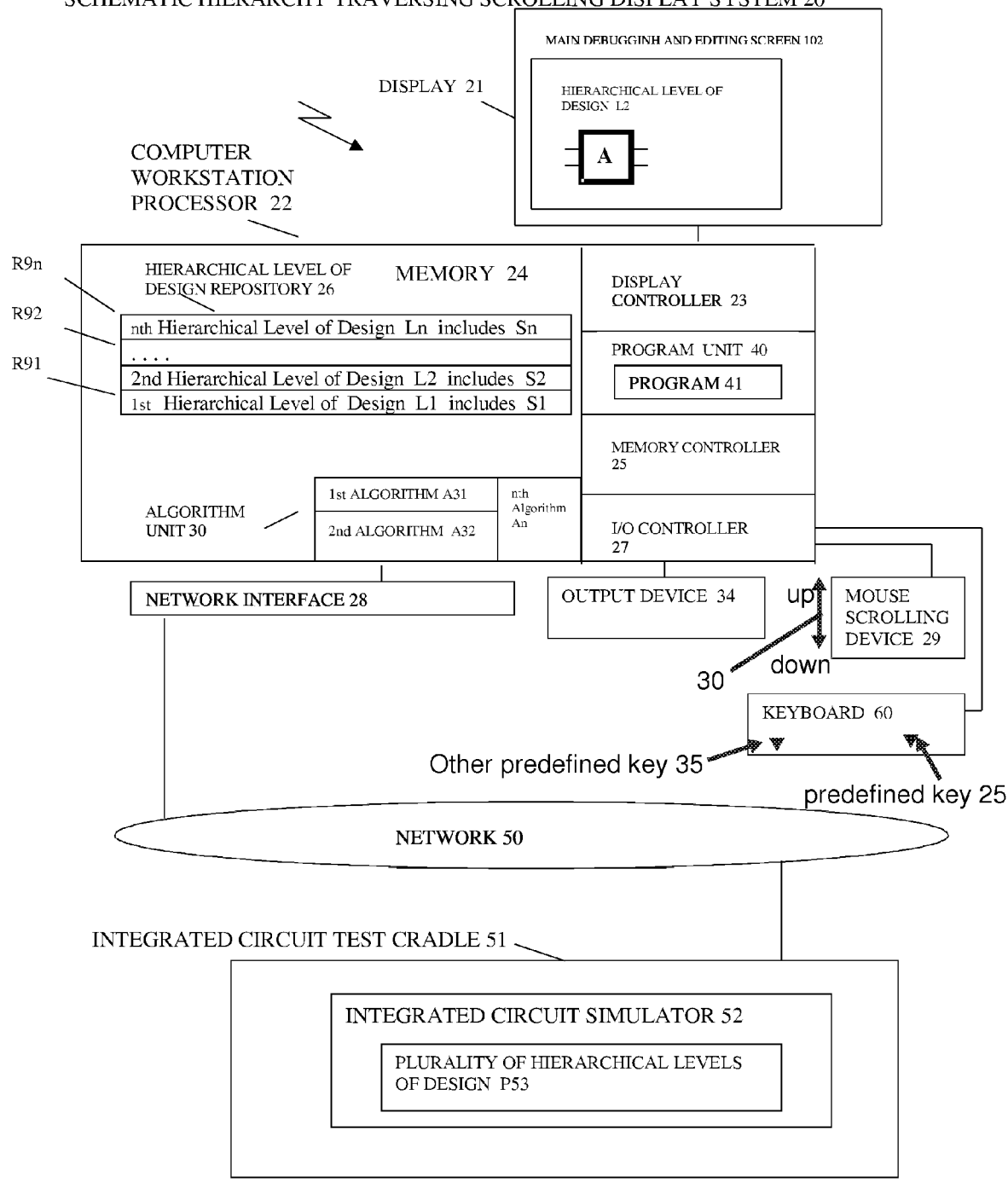
FIG. 3 illustrates the system implementing the operations illustrated in FIG. 1.

A schematic hierarchy traversing scrolling display method 70 (herein referred to as "method 70") and a schematic hierarchy traversing scrolling display system 20 (herein referred to as "system 20") implementing method 70 are illustrated in FIGS. 1 and 3 respectively. A main debugging and editing screen 102 is illustrated in FIG. 2.

Referring to FIG. 2 and FIG. 3, system 20 includes computer workstation processor 22, which contains memory 24, as illustrated in FIG. 3. Algorithm unit 30 resides in memory 24 and contains a plurality of algorithms including first algorithm A31 and second algorithm A32 up to nth algorithm An. Also, residing in system 20 is program unit 40, containing program 41. Memory 24 also contains hierarchical level of design repository 26, which contains a plurality of repository entry locations R91, R92 and up to Rn, which hold hierarchical levels of design L1, L2 up to Ln and schematics S1, S2 up to Sn respectively. In addition, the hierarchical levels of design L1, L2 up to Ln contain element items. In the exemplary embodiment, hierarchical level of design L2 is represented by schematic S2 which contains element items A1, A2 and A3, as illustrated in FIG. 2, where element items A1, A2 and A3 are first, second and third instances of the hierarchical level of design L2, and are included in hierarchical cell A block element 5, which is illustrated as the highlighted cell A block element in schematic S1. The highlighted condition of the cell A block element is indicated by a bold border around the cell A block element 5.

In the exemplary embodiment, system 20 includes a combination of controllers including display controller 23, memory controller 25 and input/output (I/O) controller 27 and a combination of computer peripheral devices communicatively coupled to system 20 including display 21, a set of input devices including keyboard 60 and mouse scrolling device 29, network interface 28, and output device 34, via standard interface connectivity. Network interface 28 communicatively couples computer workstation processor 22 via network 50 to integrated circuit test cradle 51. An integrated circuit simulator 52 is plugged into integrated circuit test cradle 51 to undergo testing and debugging exercises, as well as schematic design editing.

The integrated circuit of interest under test, illustrated in FIG. 3 as integrated circuit simulator 52, has a three dimensional layered topology of viewable design data comprising a plurality of hierarchical levels of design P53, including hierarchical levels of design L1, L2 up to Ln. Display 21 can display the plurality of hierarchical levels of design P53, when no limited viewable scope of hierarchical levels of design have been defined and set for viewing by the operator/user. In the alternative, display 21 displays only the viewable scope of hierarchical levels of design, which have been defined and set for viewing by the operator/user using any one of the set of input devices including keyboard 60 and mouse scrolling device 29. By system 20 not displaying the viewable scope of the plurality of hierarchical levels of design, operator/user fatigue is reduced, causing the operator/user to make fewer mistakes in editing the schematics of the plurality of hierarchical levels of design of the IC under test 52, during the IC design and development process.

Referring to FIG. 1 and FIG. 3 at operation start 71, the operator/user, using any one of the set of input devices including keyboard 60 and mouse scrolling device 29, activates program 41 and performs other selections in method 70 by making data entries into memory 24, of computer workstation processor 22, used by program 41, where method 70 is stored as program code on a computer executable medium. At operation start 71, the user makes a selection via an input device including one of keyboard 60 and mouse scrolling device 29 to activate program 41; thus, causing program 41 to be executed by computer workstation processor 22. At operation 72, program 41, executed by system 20, causes the system to open and display a main debugging and editing screen 102 on the display device 21, where a viewable scope of an at least one hierarchical level of design L2 can be displayed on the main debugging and editing screen 102.

At operation 73, using either of the input devices, i.e., either keyboard 60 or mouse scrolling device 29, the user assigns a viewable scope of cell A which is a block element 5 illustrated in schematic S2. The cell A block element 5 is desired for traversing in a first hierarchical level of design L2 of an integrated circuit under test illustrated in FIG. 3 as integrated circuit simulator 52.

At operation 74, computer workstation processor 22 opens the viewable scope of the block element 5 desired for traversing in response to receiving a selection signal from either a selection prompt programmed into program 41 or an algorithm routine or a call from an application programming interface or from one or more input devices from the set of input devices including keyboard 60 and mouse scrolling device 29, further including a touch screen, a wand, an infra red device, a radio frequency selection device a joystick or a light pen. In the exemplary embodiment, the selection signal can be generated when a user operator actuates an input device including the user holding down a predefined key 25 of keyboard 60, where the definition of the key can be programmed into program 41, selecting the cell A block element 5 desired for traversing by causing a cursor 10 viewable on the main debugging and editing screen 102 over the cell A block element and highlighting the cell A block element. Or, the user can merely cause a cursor 10 to be positioned over the cell A block by actuating one or more input devices. Also, the direction of the scroll mouse movement could be defined in many different ways including scroll down 30 to traverse by descending scroll up 30 to traverse by ascending or scroll up to traverse by descending or scroll down 30 to traverse by ascending. In the exemplary embodiment, the cell A block element can be a clickable block element 5. When the user clicks on the cell A block element with the mouse scrolling device 29, then rolls 30 the mouse scrolling device down over the cell A block element 5, program 41 receives signals from keyboard 60 and mouse scrolling device 29 that when communicated to program 41, executed by computer workstation processor 22 program 41, causes cell A block element to be selected and opened as part of the viewable scope of design of the hierarchical level of design L2, as illustrated as highlighted block element in schematic S1. Element items A1, A2 and A3 are first, second and third instances of the hierarchical level of design L2, included in the hierarchical cell A block element and are illustrated in Schematic S1 of FIG. 2.

At operation 75, the user using keyboard 60 and/or mouse scrolling device 29, communicatively interacts with program 41 which enables the user to descend and/or scroll 30 through at least one hierarchical level of design of the integrated circuit by scrolling through the cell A block element items A1, A2 and A3 desired for traversing in the main debugging and editing screen 102 into the at least one hierarchical level of design of the plurality of hierarchical levels of design P53 of the integrated circuit simulator 52 and causes the computer workstation processor 22 to perform the useful, concrete and tangible results of traversing the viewable scope of the at least one hierarchical level of design and conducting a debugging and/or an editing operations of the integrated circuit under test, without distractions from voluminous levels of IC topological information 20, of the plurality of hierarchical levels of design.

At operation 76, using keyboard 60 or mouse scrolling device 29, the user communicatively interacts with program 41; thereby causing the computer to close the viewable scope of the block element 5 and reverse traverse to the first hierarchical level of design, by causing the computer workstation processor 22 to position the cursor 10 in an empty area 15 of the schematic S2, while holding down an other predefined key 35 of keyboard 60 and rolling 30 the mouse scrolling device 29 in an upward direction.

At operation 77, the schematic hierarchy traversing scrolling displaying method 70 can be repeated for the plurality of hierarchical levels of design P53 of the integrated circuit or the schematic hierarchy traversing scrolling displaying method 70 can be ended by the user, when the user determines that the desired levels of hierarchical design have been traversed. When the schematic hierarchy traversing scrolling displaying method 70 is repeated for other hierarchical levels of design, the user is able to view schematic elements underneath the at least one hierarchical level of design L2. Additional cell block elements desired for traversing, i.e., cells B, C and D are clickable and selected element items associated with these cells B, C and D can be viewed and traversed, debugged and edited.

While the disclosure has been described with reference to an exemplary method and system embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of displaying hierarchical navigating, debugging and editing of selected hierarchical levels of design of a plurality of hierarchical levels of design in graphical hierarchical design applications, wherein graphical hierarchical design applications include a schematic, the method comprising:

displaying, on a display device of a computer workstation processor, a main debugging and editing screen, in response to the computer workstation processor receiving a selection signal from a user;

activating the main debugging and editing screen to open on the display device of the computer workstation processor, wherein the main debugging and editing screen includes a first hierarchical level of design from the plurality of hierarchical levels of design of graphical hierarchical design applications, wherein graphical hierarchical design applications include card design, auto/plane design, computer aided design (CAD) and integrated circuit design applications, wherein the plurality of input devices includes a mouse scrolling device, a keyboard including a plurality of keyboard keys, and wherein an at least one of the plurality of keyboard keys is programmed as an at least one predefined keyboard key; and assigning a viewable scope of a block element desired for traversing in the at least first hierarchical level of design of the plurality of hierarchical levels of design of the integrated circuit, when the user using the at least one input device from the plurality of input devices of the computer workstation processor, performs sub operations including:

holding down the at least one predefined keyboard key;

selecting a block element desired for traversing by causing a cursor to be positioned over the block element desired for traversing;

highlighting the block element desired for traversing with the mouse scrolling device, wherein the block element desired for traversing is depicted in the schematic of the integrated circuit; and opening the viewable scope of the block element for traversing highlighted in the main debugging and editing screen, wherein, the user controls the at least one input device from the plurality of input devices of the computer workstation processor to activate executable program code running on the computer workstation processor to cause the computer workstation processor to perform a useful, concrete and tangible result of displaying hierarchical navigating, debugging and editing operations of selected hierarchical levels of design of the plurality of hierarchical levels of design of the integrated circuit without distractions from voluminous levels of IC topological information, of the plurality of hierarchical levels of design of the integrated circuit;

when the user performs sub operations including:

rolling the mouse scrolling device in a downward direction; and closing the viewable scope of the block element, when the user using the at least one input device from the plurality of input devices of the computer workstation processor, performs sub operations including:

causing the cursor to be positioned in an empty area of the schematic;

holding down an other predefined keyboard key; and rolling the mouse scrolling device in an upward direction.

2. The method according to claim 1, wherein in response to the user using the at least one input device, the computer workstation processor further performs one of scrolling through additional hierarchical levels of design by repeating displaying hierarchical navigating, debugging and editing of selected hierarchical levels of design and ending displaying hierarchical navigating, debugging and editing of selected hierarchical levels of design.

3. A system of displaying hierarchical navigating, debugging and editing of selected hierarchical levels of design of a plurality of hierarchical levels of design in graphical hierarchical design applications, wherein graphical hierarchical design applications include a schematic, the system comprising:

a computer workstation processor;

a combination of computer peripheral devices communicatively connected to the computer workstation processor, where the combination of computer peripheral devices includes a display device, a plurality of input devices including a keyboard and a mouse scrolling device, an output device, and a network interface, wherein the network interface is communicatively connected to a network, wherein the network is communicatively connected to an integrated circuit test cradle containing the integrated circuit under test, and the integrated circuit under test contains a plurality of hierarchical levels of design;

a combination of controllers residing in the computer workstation processor, wherein the combination of controllers includes a display controller, a memory controller and an input/output controller;

a memory, a program unit and an algorithm unit residing in the computer workstation processor, wherein the memory contains a repository for the hierarchical levels of design, the algorithm unit contains a plurality of algorithms and the program unit contains a program that when executed by the computer workstation processor, causes the computer workstation processor to: display, on the display device of the system, a main debugging and editing screen, in response to the computer workstation processor receiving a selection signal from a user that causes the main debugging and editing screen to open on the display device, wherein the main debugging and editing screen includes a first hierarchical level of design from the plurality of hierarchical levels of design of graphical hierarchical design applications, wherein graphical hierarchical design applications include card design, auto/plane design, computer aided design (CAD) and integrated circuit design applications, wherein the plurality of input devices includes a mouse scrolling device, a keyboard including a plurality of keyboard keys, and wherein an at least one of the plurality of keyboard keys is programmed as an at least one predefined keyboard key; and the computer workstation processor configured to assign a viewable scope of a block element desired for traversing in the at least first hierarchical level of design of the plurality of hierarchical levels of design of the integrated circuit, when the user using the at least one input device from the plurality of input devices, performs sub operations including:

holding down the at least one predefined keyboard key;

selecting a block element desired for traversing by causing a cursor to be positioned over the block element desired for traversing;

highlighting the block element desired for traversing with the mouse scrolling device, wherein the block element desired for traversing is depicted in the schematic of the integrated circuit; and opening the viewable scope of the block element for traversing highlighted in the main debugging and editing screen, wherein, the user controls the at least one input device from the plurality of input devices of the computer workstation processor to activate executable program code running on the computer workstation processor to cause the computer workstation processor to perform a useful, concrete and tangible result of displaying hierarchical navigating, debugging and editing operations of selected hierarchical levels of design of the plurality of hierarchical levels of design of the integrated circuit without distractions from voluminous levels of IC topological information, of the plurality of hierarchical levels of design of an integrated circuit; when the user performs sub operations including:

rolling the mouse scrolling device in a downward direction; and closing the viewable scope of the block element, when the user using the at least one input device from the plurality of input devices of the computer, performs sub operations of:

causing the cursor to be positioned in an empty area of the schematic;

holding down an other predefined keyboard key; and rolling the mouse scrolling device in an upward direction.

4. The system according to claim 3, wherein in response to the user using the at least one input device, the computer workstation processor further perform one of scrolling through additional hierarchical levels of design by repeating displaying hierarchical navigating, debugging and editing of selected hierarchical levels of design and ending displaying hierarchical navigating, debugging and editing of selected hierarchical levels of design.

* * * * *